United States Patent [19]

Reinhardt

[11] 4,052,809

[45] Oct. 11, 1977

[54] FISHING LURE

[76] Inventor: Paul W. Reinhardt, Rte. No. 4, Box 355, Kingston, Tenn. 37763

[21] Appl. No.: 710,316

[22] Filed: July 30, 1976

[51] Int. Cl.² .......................................... A01K 85/00
[52] U.S. Cl. ................................. 43/42.22; 43/42.5
[58] Field of Search ............... 43/42.09, 42.47, 42.22, 43/42.23, 42.5

[56] References Cited

U.S. PATENT DOCUMENTS

| 2,435,932 | 2/1948 | Smith | 43/42.47 |
| 2,522,179 | 9/1950 | Jensen, Sr. et al. | 43/42.22 |
| 2,575,626 | 11/1951 | Isaac | 43/42.47 |
| 2,604,716 | 7/1952 | Hair, Jr. | 43/42.09 |
| 2,715,790 | 8/1955 | Carpenter | 43/42.09 |
| 2,828,572 | 4/1958 | Sargent | 43/42.5 |

Primary Examiner—Warner H. Camp
Attorney, Agent, or Firm—Martin J. Skinner

[57] ABSTRACT

A thin substantially flat elongated metal spoon has an attached stabilizing buoyant body member covering a major portion of one surface of the spoon leaving an exposed bill of the spoon for deformation to modify, if desired, the characteristic movements of the lure during movement through the water. The exposed second surface of the spoon is highly reflective and is provided with hook-attaching means. The bill portion is provided with means for attaching the lure to a fishing line. The resultant lure is characterized by being laterally self-stabilized but unstable in a vertical and horizontal direction so as to provide for darting and dipping actions.

4 Claims, 6 Drawing Figures

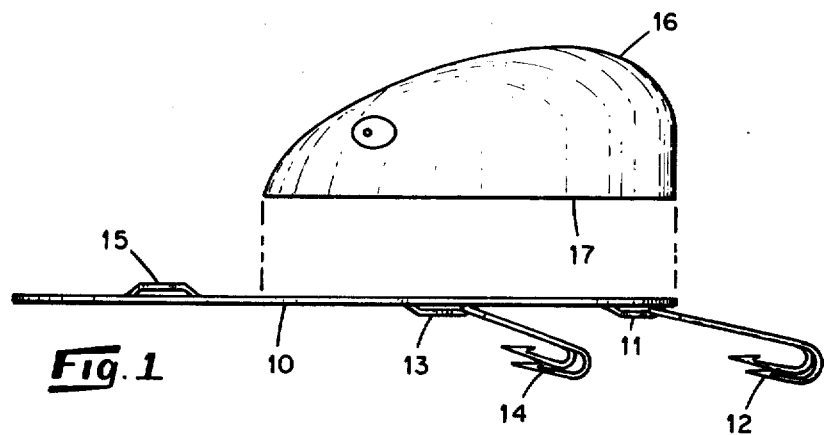
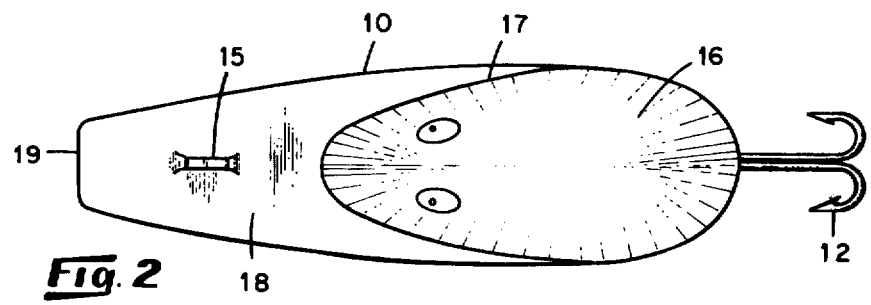
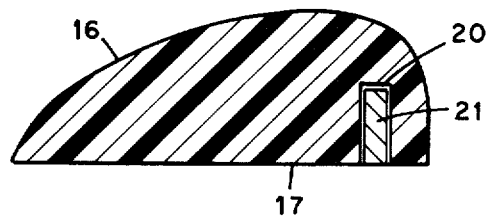
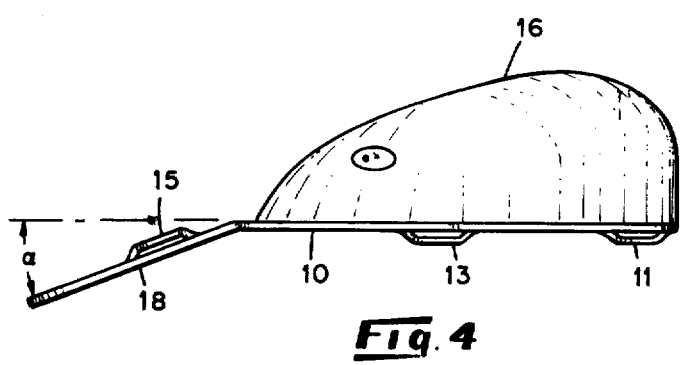

FISHING LURE

BACKGROUND OF THE INVENTION

The present invention relates in general to artificial lures used for fishing, and more particularly to an improved type of "crank bait" characterized by combined high reflectivity, good action and ease of manufacture.

In a recent article on fishing lures ("A Guide to Lures", K. Schultz, Field and Stream, LXXXI, No 3, July 1976), a distinction is made of the various types of lures, dividing them into seven categories: spoons, spinners, jigs, surface plugs, shallow-running plugs, deep-diving plugs and soft baits. Those lures that are cast, then retreived, are generally referred to as "crank bait". It is reported that there are 124 manufacturers of fishing lures within the American Fishing Tackle Manufacturers Association, as well as other firms, that produce a multiplicity of lures in each of the categories.

It is recognized that, in general, one category of lure may be more effective than another for a specific specie of fish. For example, spinners are generally used for panfish, trout, pike and similar fish. Plug-type baits, in contrast, are generally useful for bass-family fishing. As indicated by their title, the difference in the categories of plugs is their location with respect to the water surface as they are moved through the water. The factors determining the "running" characteristics are the degree of buoyancy, the plug shape and the force applied by the fishing line. A non-buoyant plug, for example, would tend to sink when cast into water but a proper planing surface of the plug may cause the plug to remain near the water surface during movement through the water. The reverse action is possible with a buoyant plug having a different shape. Any of the plugs must, however, have lateral stability, i.e., be resistant to angular movement about a longitudinal "axis" of the lure (generally an extension of the fishing line). Dipping and darting movements, or instabilities, are desirable, these movements being limited by the force exerted on the fishing line.

Although most manufactured plug-type lures provide these use characteristics, the exterior form chosen for the plugs creates certain problems in manufacture. For example, when a degree of curvature is used on all surfaces—back, belly, and sides—special holding devices are required for moving the plugs along an assembly line for applying patterned decorations. Similar problems occur in the basic manufacture of the body itself. Finally, the finished product generally performs with only one depth characteristic during movement through the water.

BRIEF DESCRIPTION OF THE DRAWINGS

FIG. 1 is an exploded view of the essential components of an improved fishing lure;

FIG. 2 is a top view of the complete fishing lure of my design as shown in FIG. 1;

FIG. 3 is a longitudinal cross section of the body member of FIGS. 1 and 2;

FIG. 4 is a side elevation of a second embodiment of my invention;

SUMMARY OF THE INVENTION

Figure 5:
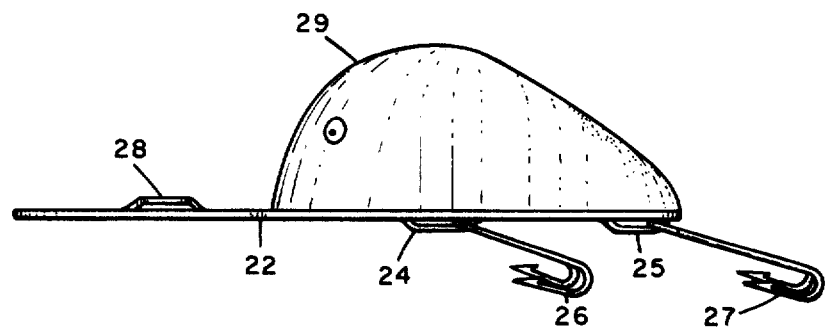
FIG. 5 is a side elevation of another embodiment.

My invention is an improved artificial lure of the plug type. It comprises an elongated, substantially flat, highly reflective metal spoon; a buoyant body attached to, and covering a major portion of one surface of the spoon; means on the spoon for the attachments of hooks; and means also on the spoon for the attachment of a fishing line. The body is streamlined and shaped to imitate various baits. An internal weight may be provided within the body to improve casting characteristics of the lure.

DETAILED DESCRIPTION

The essential components of my fishing lure are illustrated in the exploded view of FIG. 1. A thin, substantially flat spoon 10 is provided with a downwardly extending loop 11 near one end (rear) for the attachment of a hook member 12, such as a dual hook, as shown. Although the literal meaning of "spoon" relates to curved like a spoon, in the fish bait art it includes a flat surface. My descriptive term "substantially flat" is meant to mean an object cut from a flat sheet of metal. A second downwardly-extending loop 13 may be provided near the center of the spoon 10 for the attachment of a second hook member 14, if desired. The spoon 10 is also provided with an upwardly-extending loop 15 toward the second end (forward) for the attachment of a fishing line (not shown). Each of the loops (11, 13, 15) is positioned on, and is aligned with, the longitudinal centerline of the spoon 10.

A buoyant body member 16 is attached to the upper surface of the spoon 10 and covers one-half to three-forths of the spoon forwardly from the rearward end. The contacting surface 17 of the body 16 is flat to conform to the spoon 10, and the remainder of the body 16 is contoured in a generally sloping curvature. In this embodiment, the forward portion of the body is smaller in width and height than rearward portion. The body is attached to the spoon 10 in any suitable manner, such as with permanent adhesive. The exterior of the body is finished in a desirable pattern and hue.

A top view of my fishing lure of FIG. 1 is shown in FIG. 2. It may be seen that the perimeter of the surface 17 of body 16 substantially conforms with the periphery of the spoon 10 from about a midpoint rearwardly. The remaining uncovered portion of the spoon forms a "bill" 18 which provides for characteristic movement of the lure when drawn through the water. The forward end 19 of the bill 18 is generally blunt; however, this is not a necessity. This view shows more clearly the position of loop 15 for the attachment of a fishing line. This loop is spaced generally midway between the body 16 and the forward end 19 of the bill 18. The streamlined contour of the body 16 of this embodiment is also shown.

A longitudinal cross-section of the body 16 of FIG. 1 is shown in FIG. 3. In this embodiment, a cavity 20 is provided within the body 16 extending upwardly from surface 17 near the rearward end of the body. A weight 21 may be inserted within cavity 20 to improve the casting characteristics of the lure; e.g., to increase casting distance, to minimize entanglement of hooks 12 (and/or hooks 14) with a casting line, etc.

A modified embodiment of my fishing lure is shown in FIG. 4. As in FIGS. 1 and 2, the bill portion 18 is integral with the remainder of the spoon 10; however, the bill is inclined downwardly at the forward end of the body, with respect to the plane of the spoon portion under the body 16. The angle, $\alpha$, between the plane of the bill and the plane of the remainder of the spoon determines the diving characteristic of the lure. In my lure construction this angle, α, may be adjusted by the angler from 0° to about 45° to achieve a desired characteristic. In addition, the angler may slightly twist the bill 18 to adjust the retrieval path of the lure. Although not shown, hooks would be attached to loops 11, 13.

Figure 6:
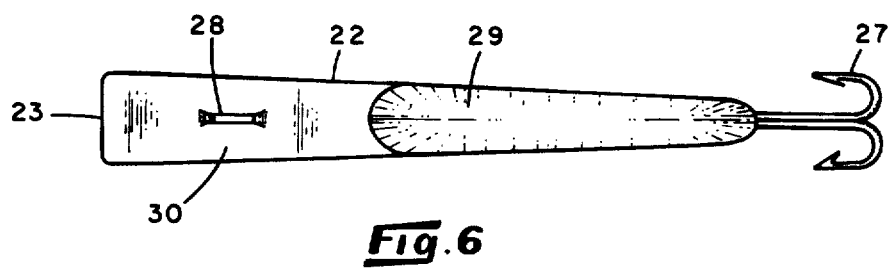
FIG. 6 is a top view of the embodiment of FIG. 5.

Still another embodiment of my invention is illustrated in FIGS. 5 and 6. As in FIGS. 1 and 2, a flat metallic spoon 22 forms the base of the lure. The forward end 23 is generally blunt, and the spoon 22 tapers inwardly toward the rearward end. Projecting downwardly from the spoon 22 are a pair of loops 24, 25 (only one required) for the attachment of appropriate hooks 26, 27. An upwardly projecting loop 28 is provided on the upper surface of the spoon 22, rearwardly from the forward end 23, for the attachment of a fishing line (not shown).

Attached to the top surface of spoon 22 is a streamlined buoyant body 29, the side contours generally conforming to the taper of the spoon. This body covers one-half to three-forths of the rearward upper surface; the remaining uncovered (forward) spoon portion forming a bill 30. As in the previous embodiment, the line-attachment loop 28 is a substantial distance away from the body 29 toward the forward end 23 of the bill 30; e.g., generally near the middle of the bill 30. In this embodiment, the body 29 has a greater height and width in the forward portion than in the rearward portion. The body may be provided with an internal weight (not shown) in a manner of FIG. 3. As in the embodiment of FIG. 4, the bill 30 may be bent to alter the characteristic movements of the lure through the water.

The spoon (and integral bill) of my lure is typically fabricated from stainless steel, polished aluminum, etc. A single stamping operation provides the necessary edge contour and forms the loops for the hooks and line. The loops may, alternatively, be welded or otherwise joined to the spoon. Typically, the thickness of the spoon is about 0.018 in. (0.45mm); the total length may be about from 2 to 4 inches (5–10 cm); and the width about 0.5 to 1 in. (1.25–2.5 cm). These dimensions are, however, not limiting to my invention. The ratio of length to width is from about 6:1 to about 3:1. The bill, in general, is one-fourth to one-half of the total length.

The body member is fabricated from any suitable buoyant material such as balsa wood, rigid plastic, etc. If fabricated from a plastic, it may be molded using any conventional technique. In either case, the surface patterns and colors may be applied by spray or other suitable techniques. Due to the flat lower surface of the body, to which no pattern or color needs to be applied, the lure bodies are easily handled for this finishing operation in contrast to lures having a continuous curvature to be decorated.

The integral loops permit the easy attachment of double hooks. If single or treble hooks are desired by the angler, the double hooks may be removed and the substitute hooks attached as with a spiral ring. Alternate types of hooks may also be attached during assembly of the lure.

The product of my invention is an easily fabricated and effective lure of the "crank bait" type useful for many species of fish due to the combined spoon and body construction. The relatively large buoyant body together with the position of the line attachment, automatically provides high lateral stability, while the bill provides the desired vertical and horizontal instabilities to impart darting and diving characteristics. These unstable characteristics may be modified by altering the angle of the bill, as described above.

I claim:

1. An artificial fishing lure characterized by adjustable vertical and horizontal instabilities, and automatically-compensating lateral stability, during retrieval through water by an angler, which comprises:
   a planar, highly reflective, nonbuoyant spoon of uniform thickness;
   a streamlined buoyant body member having a planar lower surface, said surface attached to and substantially covering a rearward portion of a first surface of the spoon leaving an exposed forwardly-extending planar bill portion of the spoon;
   a first loop extending upwardly on the bill portion of the spoon on the first surface, at a position substantially midway between the body and a forward end of the bill portion, for the attachment of a fishing line;
   a second loop on a second surface of the spoon extending downwardly at a rearward end of the spoon;
   a fish hook attached to the second loop; and
   wherein the spoon is sufficiently thin whereby the bill portion may be finger-manipulated by the angler for adjusting the retrieval characteristics of the lure.

2. The fishing lure of claim 1 further comprising a third loop on the spoon for the attachment of a second hook member to the second surface of the spoon.

3. The fishing lure of claim 1 wherein the loops for attaching the hook member and the fishing line are formed integrally with the spoon, the loops being positioned on and aligned with a longitudinal center line of the spoon.

4. The fishing lure of claim 1 wherein the bill portion lies in a plane forming an angle, α, with the plane of the remainder of the spoon below the body, the angle α being between 0° and about 45°.

* * * * *